(No Model.)
F. G. BARTHEL.
SELF ACTING MOTOR AND PUMP.
No. 378,998. Patented Mar. 6, 1888.
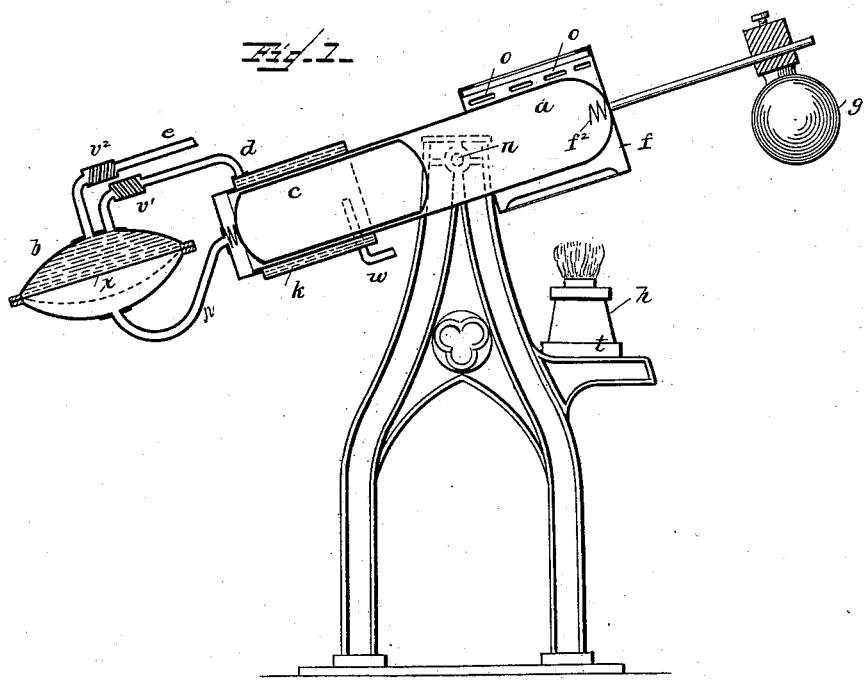
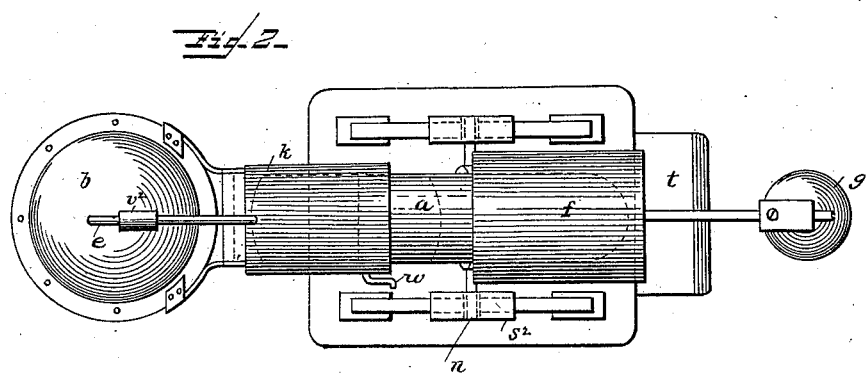
WITNESSES.
Edwin L. Jewell
Frank W. Hanson
INVENTOR,
Frederick Gustav Barthel.
By Wm. H. Babcock
Attorney.

UNITED STATES PATENT OFFICE.

FRIEDRICH GUSTAV BARTHEL, OF NIEDERPOYRITZ, NEAR DRESDEN, ASSIGNOR TO PAUL ALEXANDER KÜHNE, OF DRESDEN, SAXONY, GERMANY.

SELF-ACTING MOTOR AND PUMP.

SPECIFICATION forming part of Letters Patent No. 378,998, dated March 6, 1888.

Application filed July 19, 1887. Serial No. 244,776. (No model.)

*To all whom it may concern:*

Be it known that I, FRIEDRICH GUSTAV BARTHEL, chemist, of Niederpoyritz, near Dresden, a citizen of Germany, residing at Neiderpoyritz, near Dresden, in the Kingdom of Saxony, have invented certain new and useful Improvements in Self-Acting Apparatus and Motor for Sucking and Forcing Water and for Analogous Uses; and I do hereby declare the following to be a full, clear, and exact description of the invention, such as will enable others skilled in the art to which it appertains to make and use the same.

The object of my invention is to manufacture an improved form and description of hot-air pumping and motive-power engine.

In order that my invention may be particularly described and ascertained, reference is hereby made to the accompanying drawings, in which similar letters of reference indicate corresponding parts.

Figure 1 is a sectional elevation, and Fig. 2 a plan, showing one method of carrying out my invention.

The apparatus consists, principally, of a cylinder, $a$, closed at one end, while its other end communicates, by means of the pipe $r$, with the reservoir $b$. The cylinder $a$ carries an inner cylinder, $c$, which is made thoroughly air-tight and is free to slide in the cylinder $a$, and which, according to the position of the apparatus, approximately fills up either the one or the other half of the cylinder $a$, whereby the air contained in the cylinder $a$ is driven from end to end of the cylinder. One end of the cylinder $a$ is inclosed in a water-jacket, $k$, whereby it is maintained at a low temperature. The other end of the cylinder $a$ is heated by a lamp, $h$, or other source of heat, placed upon the plate $t$. The apparatus is sustained by means of trunnions $n'$ $n^2$, resting upon the two frames $s'$ $s^2$, upon which it is balanced. The weight $g$ is made adjustable in order to balance the opposite end of the apparatus.

When the apparatus is used for the purpose of pumping, the two pipes $d$ and $e$ serve, respectively, for the entrance or supply of water to and the outflow of the same from the reservoir. The inlet-pipe $d$ is provided with a valve, $v'$, which opens inward to admit water to the reservoir, while the outlet-pipe $e$ is provided with a valve, $v^2$, which allows the water to flow out of the reservoir $b$ and prevents it from returning to the same. The pipe $w$ conveys fresh water to the jacket $k$, and the pipe $e$ carries the water flowing from the reservoir $b$ to any suitable receptacle. These pipes are provided with india-rubber junction-tubes.

The position of the apparatus, as shown in the drawings, is that which it assumes when the source of heat is removed.

The apparatus operates in the following manner: It is set in motion by placing a gas, petroleum, or spirit lamp, $h$, upon the plate $t$ and under the heat-jacket $f$. This heat-jacket is open at the bottom to allow the entrance of hot gases, and is provided with slots $o$ at the top to permit the escape of the products of combustion. The hot gases heat the right-hand end of the cylinder $a$, whereby the air contained therein is expanded, and thereby forced past $c$ toward the cool end, and through the pipe $r$ to the reservoir $b$ below the elastic diaphragm $x$, fitted air-tight within the latter, and consisting of expanding material, such as india-rubber, the diaphragm being consequently raised by the pressure. The water contained in the upper part of the reservoir $b$ is forced through the outlet-pipe $e$ and conveyed for use to a fountain or any other suitable receptacle. This operation renders the whole of the left-hand part of the apparatus lighter in weight, in consequence of the partial removal of the water, thereby allowing the counter-weight $g$ to fall, in consequence whereof the cylinder $c$ travels to the right-hand end of the cylinder $a$. The spiral springs $f'$ $f^2$ at the ends of the cylinder $a$ reduce vibration. When the cylinder $c$ arrives at the right-hand end of the cylinder $a$, the heated air is forced into the left-hand end of the cylinder, which is cooled by means of the water-jacket $k$, whereby the air is reduced in volume. The diaphragm $x$ then descends to about the dotted line shown in Fig. 1 in the reservoir $b$, in consequence whereof some of the water is drawn from the jacket $k$ into the reservoir $b$. The left-hand side of the apparatus, being now weighted, sinks, and by sinking raises the counter-weight $g$, thus causing the cylinder $c$ to return to the left-hand end of the cylinder $a$ and to transfer the cold air into the right-hand end thereof. Here the air is reheated and again forces the water out of the reservoir $b$ into the fountain or other receptacle. The left-hand end becoming again lighter in weight, the weight $g$ falls and the former operation is repeated. In this manner the apparatus operates automatically and noiselessly from thirty to forty times per minute, according to its construction.

The diaphragm $x$, consisting of india-rubber or other expansible material, is fitted air-tight in the reservoir $b$, upon which the pressure of air operates and forces the water through the outlet-pipe $e$ and prevents the passage of air through the outlet-pipe and consequent interruptions that would thereby arise in the outfall of water. The cylinder $a$ may be coated on exposed parts with asbestus or other non-conducting material to prevent loss of heat.

What I claim as new, and desire to secure by Letters Patent, is—

1. The combination of a pivoted cylinder and a smaller cylinder movable inside of it, with a heating device acting on one end of the former cylinder, a water-jacket surrounding the other end of said cylinder, a reservoir provided with a flexible diaphragm, a pipe extending from the space on one side of said diaphragm to said water-jacket, and a pipe extending from the space on the other side of said diaphragm to the interior of the cylinder at the end surrounded by said water-jacket, for the purposes set forth.

2. The cylinder $a$, provided with trunnions, in combination with the supporting-frame in which they are mounted, the springs $f'$ $f^2$ at each end of said cylinder, the smaller cylinder, C, sliding within cylinder A and against said springs, the reservoir B, the water-jacket K, surrounding one end of cylinder A and supplied by said reservoir, and the pipe $r$, conducting air from the interior of said cylinder to said reservoir, for the purpose set forth.

3. The cylinder A and the cylinder C, sliding therein, in combination with a water-jacket surrounding one end of the former cylinder, a heat-jacket covering the other end thereof, a heating device arranged under said jacket, a reservoir for supplying said water-jacket and mounted on the same end of said cylinder, and a counterbalance-weight carried by the other end of said cylinder, substantially as set forth.

In testimony whereof I affix my signature in presence of two witnesses.

FRIEDRICH GUSTAV BARTHEL.

Witnesses:
 HERMANN KLAUDEN,
 PAUL DRUCKMÜLLER.